H. B. TENDICK.
MACHINE FOR HANDLING WIRE.
APPLICATION FILED AUG. 30, 1915.
1,201,389.
Patented Oct. 17, 1916.
2 SHEETS—SHEET 1.
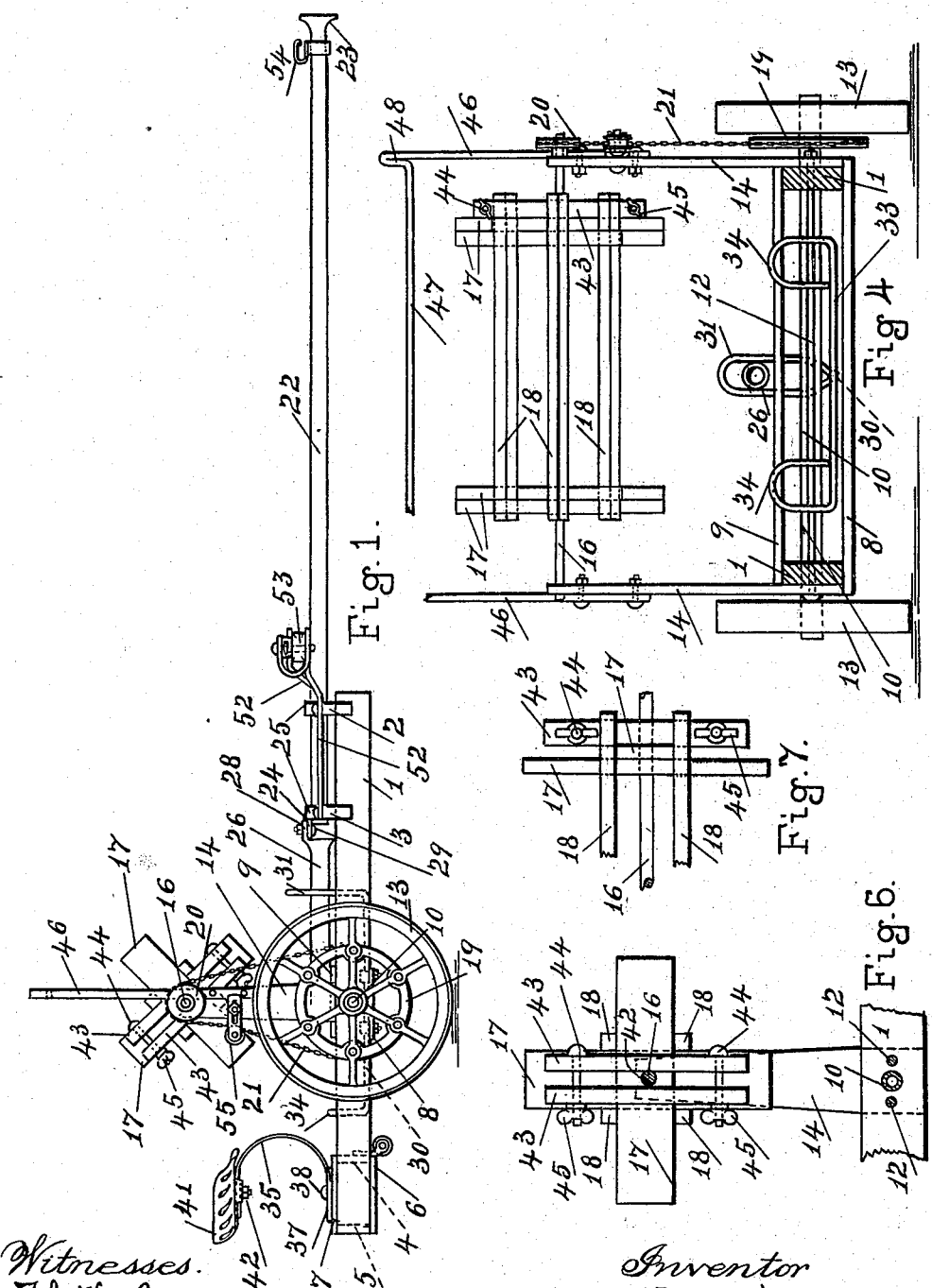
Witnesses.
John Howe Brown
Charlotte A. DuBois
Inventor
HARTA B. TENDICK,
by Atty N. DuBois.

H. B. TENDICK.
MACHINE FOR HANDLING WIRE.
APPLICATION FILED AUG. 30, 1915.
1,201,389.
Patented Oct. 17, 1916.
2 SHEETS—SHEET 2.
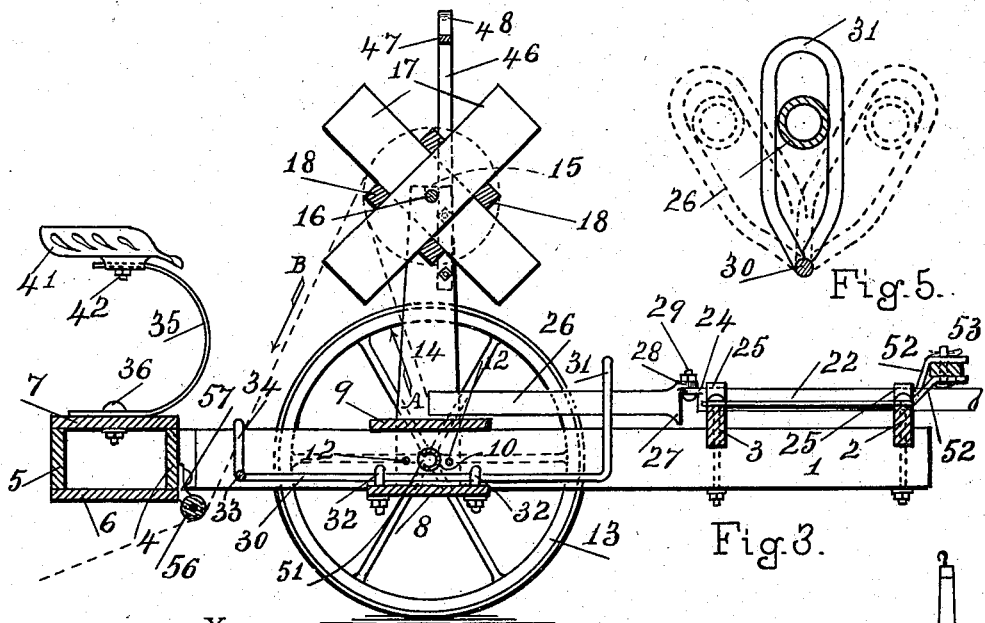
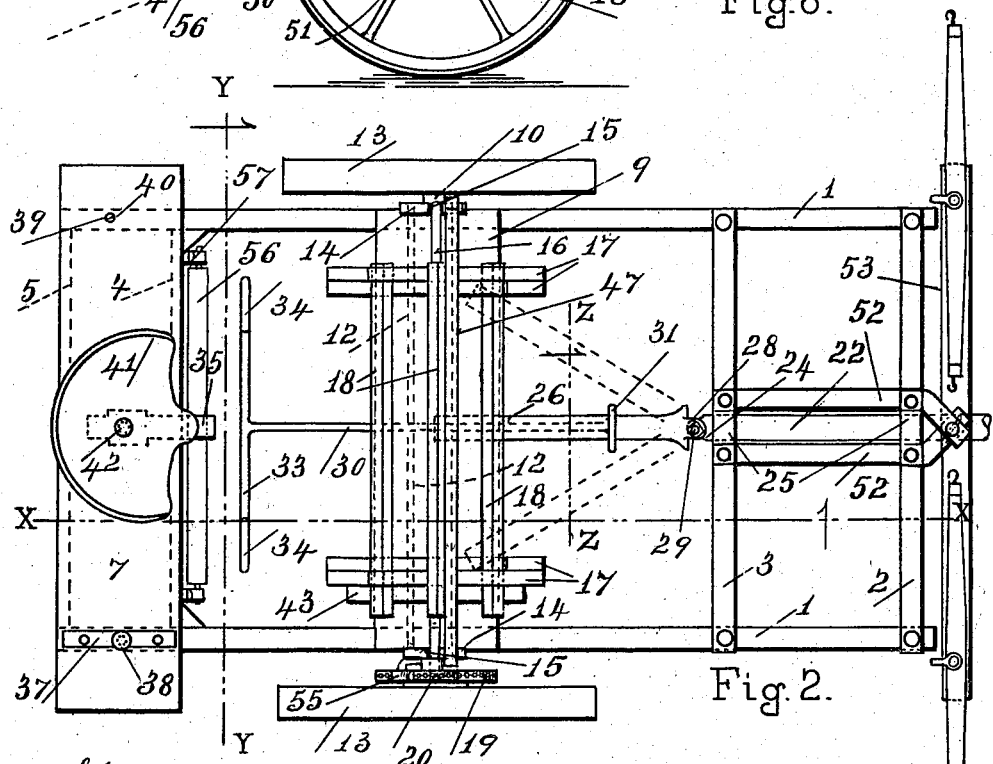

UNITED STATES PATENT OFFICE.

HARTA B. TENDICK, OF MOUNT PULASKI, ILLINOIS, ASSIGNOR OF ONE-HALF TO JAMES BRANNAN, OF MOUNT PULASKI, ILLINOIS.

MACHINE FOR HANDLING WIRE.

1,201,389.  Specification of Letters Patent.  Patented Oct. 17, 1916.

Application filed August 30, 1915.  Serial No. 47,992.

*To all whom it may concern:*

Be it known that I, HARTA B. TENDICK, a citizen of the United States, residing at Mount Pulaski, in the county of Logan and State of Illinois, have invented a new and useful Machine for Handling Wire, of which the following is a specification.

The invention relates to machines for taking up barbed fence wire and winding it onto spools and for unwinding the wire from the spools and paying it out and stretching it in such manner that it may be easily and quickly attached to the fence posts. The machine is primarily designed to handle barbed fence wire but is equally adapted to take up and pay out check row wires or ropes.

The invention is illustrated in the annexed drawings to which reference is hereby made and is hereinafter particularly described and finally recited in the claims.

Figure 1 is a side elevation of a machine embodying my invention. Fig. 2 is an enlarged top plan of the machine. Fig. 3 is a vertical longitudinal section on the line X. X. of Fig. 2. Fig. 4 is a vertical transverse section on the line Y. Y. of Fig. 2. Fig. 5 is an enlarged vertical transverse section on the line Z. Z. of Fig. 2; and Figs. 6 and 7 show enlarged details of the tension device.

Similar reference numerals designate like parts in the different views.

The machine is designed to be drawn by two horses.

The invention contemplates improved instrumentalities for the purposes stated, namely:—means for picking up the wire in front of the horses and guiding and controlling the wire so that there can be no slack wire between the horses and so that it will be impossible for the horses to trample the wire or be injured thereby; automatic means for rotating the spool; wire-controlling means operative by the feet of the driver and adapted to lay the wire evenly throughout the length of the spool; a tension device adapted to control the rotation of the spool so as to effect loose or tight winding of the wire onto the spool, at the option of the operator, or to stretch the wire when paying it out for fence building, or to permit rapid paying out of the wire when it is merely to be laid on the ground; means for supporting the driving lines above the reel so that the wire cannot catch on the lines; and a tool box of improved construction.

The frame of the machine is preferably of wood, but other suitable material may be used.

Parallel horizontal side pieces 1 are rigidly connected with each other by cross pieces 2, 3, 4 and 5. The front cross-pieces 2 and 3 support the rear part of the tongue. Parts of the cross-pieces 4 and 5 respectively serve as the front and the back of the tool box. A lower transverse plate 8, and an upper transverse plate 9 are rigidly connected with the side pieces 1. Vertical standards 14 are connected with the side pieces 1 by bolts 12 which extend through the standards and through the side pieces. Notches 15 at the upper ends of the standards accommodate the rotative spool-shaft 16. The axle 10 extends across the machine and is adapted to rotate in holes 51 in the side pieces. The supporting wheels 13 are rigidly connected with the axle. A sprocket wheel 19 is fixed on one of the wheels 13 and co-acts with a sprocket wheel 20 fixed on the spool shaft 16. A sprocket chain 21 connects the wheels 19 and 20 so that rotation of the wheel 13 will cause rotation of the shaft 16. A tightener 55 adjustably connected with one of the standards 14, controls the tension of the chain 21. The tongue 22 is tubular and is preferably an iron pipe having a terminal part 23 flared to prevent the wire from catching on the front end of the tube. Straps 25 rigidly connect the rear part of the tongue with the cross-pieces 2 and 3. At the rear end of the tongue is a boss 24. The tube 26 has one terminal 27 flared as shown so that the wire will not catch on the forward end of the tube, and also has a boss 28 complemental to the boss 24. A bolt 29 extends through the bosses 24 and 28 and pivotally connects the tube with the tongue. A shaft 30 is adapted to oscillate in stationary eyes 32 on the plate 8. At the forward end of the shaft 30 is a looped member 31 having an opening adapted to accommodate the tube 26. At the rear end of the shaft 30 is a transverse bar 33, having at its terminals stirrups 34 adapted to accommodate the feet of the driver occupying the seat 41.

The tool box comprises parts of the side pieces 1 which serve as the ends of the box and the cross pieces 4 and 5 which serve as the sides of the box; in conjunction with a bottom board 6 secured on the parts 1, 4 and 5, and a cover 7 pivotally connected with one of the side pieces 1 by a bolt 38. A dowel pin 39 is fixed in one of the side pieces 1 and fits loosely in a hole 40 in the cover 7 and the pin serves to prevent accidental turning of the cover on its pivot. To have access to the box the end of the cover adjacent to the pin 39 will be raised to disengage the cover from the pin and the cover will then be turned on its pivot 38 to move the cover rearwardly so as to uncover the box. A bolt 36 connects the springy seat-support 35 with the cover 7. A bolt 42 connects the seat 41 with the seat-support 35.

The tool box is adapted to contain the tools used in fence building. The cover 7 being pivotally connected with the main structure, the seat-support being connected with the cover, and the seat being connected with the seat-support, it is obvious that the tool box must be closed before the driver can occupy the seat and that the box being closed there is no risk of losing the tools while the machine is moving from place to place. This feature is of practical advantage because it obviates the annoyance and loss of time due to the misplacement or loss of tools.

The spool and the tension device will now be described. The spool comprises end pieces 17 at right angles to each other and connected by cross bars 18. Central holes 42 in the end pieces 17 (Fig. 6), permit the shaft 16 to normally turn freely in the holes. At one end of the spool the bars 18 extend outwardly beyond the outer faces of the pieces 17.

Clamping bars 43, one on each side of the shaft 16, are situated between and are adapted to engage on the outwardly extended parts of the cross bars 18. Bolts 44 connect the bars 43 with each other and have wing nuts 45 which may be tightened to cause the bars 43 to engage on the periphery of the shaft 16. The pull on the wire is controlled by tightening or loosening the nuts 45 as may be necessary to produce the desired tension.

While taking up the wire as indicated by the arrow A, and winding it onto the spool, or unwinding the wire as indicated by the arrow B, and laying it on the ground, comparatively slight tension will be sufficient; but if it be desired to stretch the wire for immediate attachment to the fence posts the desired length of wire will be unwound, running from the top of the spool, under comparatively slight tension; the nuts 45 will be tightened to cause the bars 43 to bear on the shaft 16 with sufficient force to prevent the spool from turning on the shaft and thereupon the machine will be pulled forward to sufficiently stretch the wire, and the machine being stopped, the staples will be driven to secure the wire on the posts; and so on for successive lengths of wire.

It has been found that a little practice enables the operator to gage the tension so as to prevent too loose winding of the wire onto the spool, and to prevent too free rotation of the spool while unwinding the wire, and to prevent breaking the wire while it is being stretched. A rotative roller 56 supported on brackets 57 guides the downwardly running wire. During the operation of winding the wire onto the spool, the operator will keep his feet in the stirrups 34 and will press downward on the stirrups alternately to oscillate the shaft 30 and cause the looped member 31 to swing the tube 26 to the right and left alternatively, to guide the wire to the spool so that it will wind evenly on the spool from right to left and from left to right.

To obviate the annoyance and danger incident to the wire catching on the lines and jerking them from the driver's hands, I provide a line-support which consists of a single iron rod bent to form uprights 46, a horizontal transverse member 47 above the reel, and guards 48. Bolts 49 rigidly connect the uprights 46 with the standards 14. When the machine is in use the lines will be supported on the member 47 and the guards 48 will keep the lines from being thrown off side-wise.

Having fully described my invention, what I claim as new and desire to secure by Letters Patent is:

1. In a wire-handling machine adapted to be propelled by horses, the combination of a main frame and supporting wheels; a rotative spool mounted on the main frame; and a tubular tongue open at both ends and connected with the main frame in line with the spool and extending forwardly in front of the horses and rearwardly behind the horses and adapted to take up the wire in front of the horses and completely inclose the wire between the horses, and also adapted to control the propulsion of the machine.

2. In a machine for handling wire, the combination of a main frame and supporting wheels; a rotative spool mounted on the main frame; a tubular tongue in line with the spool; and an oscillative tube between the spool and the rear terminal of the tongue and effective to control the laying of the wire on the spool.

3. In a machine for handling wire, the combination of a frame; a rotative spool supported on the frame; a tubular element stationary on the frame and comprising in one unitary structure a tongue adapted to control the propulsion of the machine and a tube open at both ends and adapted to take up the wire in front of the horses and completely house the wire between the horses; and a pivoted tube complemental to said tubular element and effective to control the laying of the wire on the spool.

4. In a machine for handling wire, the combination of a frame, a tubular tongue connected with the frame; a rotative spool behind the tongue; a pivoted tube normally in line with the tubular tongue; and an oscillative shaft having laterally disposed members available for oscillating the shaft on its axis and also having a member adapted to oscillate said tube on its pivot.

5. In a machine for handling wire, the combination of a frame and supporting wheels; a seat support on the frame; a seat on the seat support; a tubular tongue connected with the frame; a tube complemental to the tubular tongue; a pivot connecting the front end of the tube with the rear end of the tongue; a rotative spool between the tongue and the seat; and an oscillative shaft having a member adapted to oscillate said tube and a member transverse to the shaft and provided with stirrups positioned to accommodate the feet of the person occupying the seat.

6. In a machine for handling wire, the combination of a frame, a transverse axle rotative in the frame; supporting wheels fixed on the axle; a sprocket wheel connected with one supporting wheel; standards stationary on the frame; a spool shaft rotative in the standards; a sprocket wheel fixed on the spool-shaft; a sprocket chain connecting said sprocket wheels; a spool loose on the spool shaft and having members projecting outwardly beyond one end of the spool; clamping bars, one on each side of the spool shaft and adapted to engage said projecting members of the spool; bolts connecting said clamping bars and nuts adjustable on said bolts to vary the pressure of said clamping bars on the periphery of said spool shaft.

In witness whereof I have hereunto signed my name at Mount Pulaski, Logan county, Illinois, this 21st day of August, 1915.

HARTA B. TENDICK.

Witnesses:
WM. DITTUS,
JAMES BRANNAN.

Copies of this patent may be obtained for five cents each, by addressing the "Commissioner of Patents, Washington, D. C."